United States Patent
Hayes et al.

(10) Patent No.: US 10,422,081 B2
(45) Date of Patent: Sep. 24, 2019

(54) BARRIER COMPOSITIONS

(71) Applicant: BASF SE, Ludwigshafen (DE)

(72) Inventors: Peter Hayes, Charlotte, NC (US); Robert Proulx, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 4 days.

(21) Appl. No.: 15/556,173

(22) PCT Filed: Mar. 4, 2016

(86) PCT No.: PCT/US2016/020996
§ 371 (c)(1),
(2) Date: Sep. 6, 2017

(87) PCT Pub. No.: WO2016/144799
PCT Pub. Date: Sep. 15, 2016

(65) Prior Publication Data
US 2018/0051418 A1    Feb. 22, 2018

Related U.S. Application Data

(60) Provisional application No. 62/129,300, filed on Mar. 6, 2015.

(51) Int. Cl.
| | | |
|---|---|---|
| *D21H 19/58* | (2006.01) | |
| *C08F 257/02* | (2006.01) | |
| *C08F 265/02* | (2006.01) | |
| *C09D 151/00* | (2006.01) | |
| *D21H 21/16* | (2006.01) | |
| *B32B 27/08* | (2006.01) | |
| *B32B 27/10* | (2006.01) | |
| *C08F 212/08* | (2006.01) | |
| *C08F 220/18* | (2006.01) | |
| *C08L 9/06* | (2006.01) | |

(52) U.S. Cl.
CPC ............ *D21H 19/58* (2013.01); *B32B 27/08* (2013.01); *B32B 27/10* (2013.01); *C08F 212/08* (2013.01); *C08F 220/18* (2013.01); *C08F 257/02* (2013.01); *C08F 265/02* (2013.01); *C08L 9/06* (2013.01); *C09D 151/003* (2013.01); *D21H 21/16* (2013.01); *C08F 2500/04* (2013.01); *C08L 2207/53* (2013.01); *Y02P 20/582* (2015.11)

(58) Field of Classification Search
CPC ........ D21H 19/58; B32B 27/08; B32B 27/10; C08L 2207/53; C08L 9/06; C08F 220/18; C08F 212/08; C08F 2500/04
USPC ....................................... 428/511
See application file for complete search history.

(56) References Cited

U.S. PATENT DOCUMENTS

| | | | |
|---|---|---|---|
| 4,414,370 A | 11/1983 | Hamielec et al. | |
| 4,529,787 A | 7/1985 | Schmidt et al. | |
| 4,546,160 A | 10/1985 | Brand et al. | |
| 4,806,207 A | 2/1989 | Monzon et al. | |
| 8,940,847 B2 | 1/2015 | Cavallin | |
| 9,365,731 B2 | 6/2016 | Jhaveri et al. | |
| 2002/0069989 A1 | 6/2002 | Feret et al. | |
| 2004/0044136 A1 | 3/2004 | Jin | |
| 2006/0122318 A1 | 6/2006 | Jho et al. | |
| 2006/0135709 A1 | 6/2006 | Hasegawa et al. | |
| 2007/0232743 A1* | 10/2007 | Laviolette | D21H 19/40 524/445 |
| 2016/0032138 A1* | 2/2016 | Avramidis | C08F 257/00 524/836 |

FOREIGN PATENT DOCUMENTS

| | | |
|---|---|---|
| JP | 2006052365 | 2/2006 |
| JP | 2006152484 | 6/2006 |
| WO | 2000/44983 A1 | 8/2000 |
| WO | 2007/113121 A1 | 10/2007 |
| WO | 2013/053840 A2 | 4/2013 |
| WO | 2013113934 | 8/2013 |
| WO | 2014/140016 A1 | 9/2014 |

OTHER PUBLICATIONS

International Search Report and Written Opinion dated Jun. 7, 2016, from International Application No. PCT/US2016/020996, 12 pages.
Toagosei Annual Report, "Creating Business, Value and Profit" 1999, 38 pages.
Technical Data Sheet for Joncryl® 504, 2010, 3 pages.
Technical Data Sheet for Joncryl® 678, 2010, 3 pages.
News Release from Toagosei, Jun. 1998 available at www.toagosei.co.jp/english/news/press/backnumber/n980617.html, pulled Nov. 16, 2017, 2 pages.
Create your Coatings Brochure, commercial SGOs shown as available from BASF Corporation under the trademark Joncryl®, 2011, 40 pages.
Rule 1.132 Declaration of Kostas Avramidis in U.S. Appl. No. 14/776,778 dated Dec. 6, 2017.

* cited by examiner

*Primary Examiner* — Hui H Chin
(74) *Attorney, Agent, or Firm* — Meunier Carlin & Curfman LLC

(57) ABSTRACT

This disclosure relates to barrier compositions. The barrier composition can comprise a copolymer formed by polymerizing monomers comprising derived from a vinyl aromatic monomer and a second monomer selected from the group consisting of butadiene, alkyl (meth)acrylates, and mixtures thereof, and a solid grade oligomer. In some embodiments, the vinyl aromatic monomer and the second monomer are polymerized in the presence of the solid grade oligomer. Paper products and methods of making the paper products comprising the barrier composition are also described herein. The barrier compositions disclosed herein can be used to impart water, moisture, grease, oil, and/or oxygen resistance to the paper product.

21 Claims, 2 Drawing Sheets

BARRIER COMPOSITIONS

CROSS REFERENCE TO RELATED APPLICATIONS

This application is a national stage application filed under 35 U.S.C. § 371 of PCT/US2016/020996 filed Mar. 4, 2016, which claims the benefit of U.S. Provisional Application No. 62/129,300 filed Mar. 6, 2015 which is hereby incorporated in its entirety and for all purposes.

FIELD OF THE DISCLOSURE

This disclosure relates to barrier compositions, and more particularly to barrier compositions that include a copolymer and a solid grade oligomer and to methods of making and using the barrier compositions.

BACKGROUND

Barrier properties are important in reducing the penetration of moisture, oil, grease, aromas and, in some cases, bacteria. For example, paper and paper-based products can shrink or swell depending on the moisture content within the paper and such shrinking and swelling can cause tearing. There is an ongoing trend to coat paper products with plastic films such as polyethylene and polypropylene to provide moisture vapor barrier protection. However, while these films provide good moisture vapor barrier properties, they limit recyclability of the paper product. The plastic films do not disintegrate, and special equipment is required to separate the paper product from the barrier film. In view of the foregoing limitations of known barrier films, there remains a need for barrier compositions which exhibit sufficient barrier properties in reducing the penetration of moisture, oil, grease, aromas and, in some cases, bacteria, but which readily separates, degrade, from a recyclable substrate. The compositions and methods disclosed herein, addresses this need.

SUMMARY OF THE DISCLOSURE

A barrier composition is disclosed that comprises a copolymer formed by polymerizing monomers comprising derived from a vinyl aromatic monomer and a second monomer selected from the group consisting of butadiene, alkyl (meth)acrylates, and mixtures thereof, and a solid grade oligomer. In some embodiments, the vinyl aromatic monomer and the second monomer are polymerized in the presence of the solid grade oligomer. The solids in the barrier composition can comprise 50% by weight or greater of the copolymer and solid grade oligomer.

The vinyl aromatic monomer can include styrene, alkylstyrenes, or a combination thereof. The second monomer can include 2-ethylhexyl acrylate, butyl acrylate, ethyl acrylate, methyl acrylate, methyl methacrylate, optionally a crosslinking monomer, or a combination thereof. The solid grade oligomer can be derived from monomers including monomers selected from the group consisting of styrene, alkylstyrenes, (meth)acrylic acids or salts or esters thereof, alkoxy (meth)acrylates, and combinations thereof. In some embodiments, the barrier composition can be formed by polymerizing styrene and butadiene in the presence of the solid grade oligomer. In some embodiments, the barrier composition can be derived from 4%-80% by weight styrene, 4%-80% by weight butadiene, and 10%-45% by weight solid grade oligomer. In other embodiments, the barrier composition can be derived from 25%-50% by weight styrene, 30%-45% by weight butadiene, and 20%-30% by weight solid grade oligomer. The copolymer can be covalently linked to the solid grade oligomer. In some embodiments, the copolymer is grafted onto the surface of the solid grade oligomer. The copolymer of the barrier composition can have a weight average molecular weight of at least 250,000 Daltons, for example, 250,000 Daltons to 750,000 Daltons. The solid grade oligomer of the barrier composition can have a weight average molecular weight of 20,000 Daltons or less, for example 5,000 Daltons to 10,000 Daltons.

The barrier composition can comprise additives such as a pigment. In some embodiments, the pigment is clay. The pigment can be from 1%-50% by weight of the barrier composition. In some embodiments, the barrier composition is substantially free of a low molecular weight surfactant.

The barrier composition can be provided as an aqueous dispersion comprising the copolymer and the solid grade oligomer. In some embodiments, the aqueous dispersion has a solids content of at least 40%.

Paper products comprising the barrier composition are also described herein. In some embodiments, the barrier composition can be provided as a coating on the paper. The barrier composition can be from 0.01 to 2.5 wt. % of the paper. In some embodiments, the barrier composition can have a coating weight of 5 g/m$^2$ to 30 g/m$^2$ on the paper. In some embodiments, the paper comprises a paper web formed of cellulosic fibers and the barrier composition is provided throughout the paper web. The barrier composition can be 5 to 30 wt. % of the paper web.

The barrier compositions disclosed herein can be used to impart water, moisture, grease, oil, and/or oxygen resistance to the paper. In some embodiments, the paper can exhibit a Cobb value of 25 g/m$^2$ or less. In some embodiments, the paper has a moisture vapor transmission rate of 35 g/m$^2$ or less per 24 hours when measured at 25° C. and 50 RH %. In some embodiments, the paper can have a moisture vapor transmission rate of from 10 g/m$^2$ to 25 g/m$^2$ per 24 hours when measured at 25° C. and 50 RH %. In some embodiments, the paper has a block resistance of 2 or less per 24 hours at 60° C. and 60 psi, as determined by ASTM WK20008.

Methods of making paper products comprising the barrier composition are also described herein. The method can include contacting a cellulosic fiber with any of the barrier compositions described herein. In some embodiments, contacting the cellulosic fiber with a barrier composition can include coating a paper web comprising the cellulosic fiber with an aqueous dispersion comprising the barrier composition. In some embodiments, coating the paper web comprises spraying an aqueous dispersion comprising the barrier composition on the paper web. In some embodiments, contacting the cellulosic fiber with the barrier composition can include mixing an aqueous dispersion comprising the barrier composition with an aqueous slurry comprising the cellulosic fibers to form a mixture, and forming a paper web form the mixture of the cellulosic fibers and the barrier composition.

The details of one or more embodiments are set forth in the description below. Other features, objects, and advantages will be apparent from the description, the figures, and the claims.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

DESCRIPTION OF THE DISCLOSURE

Figure 1:
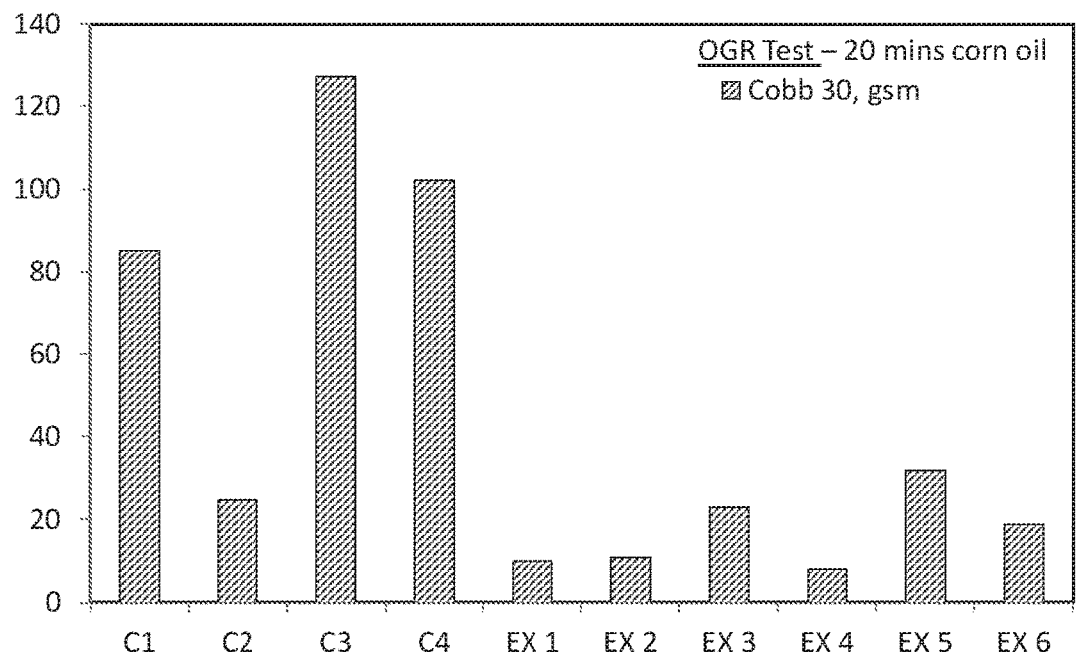
FIG. 1 is a bar graph showing the liquid water resistance of the barrier compositions in Examples 1-6 and Comparative Examples 1-4.

Disclosed herein are barrier compositions comprising a copolymer derived from a first monomer and a second monomer and a solid grade oligomer, wherein the first monomer and the second monomer are polymerized in the presence of the solid grade oligomer. The barrier composition can be an aqueous dispersion comprising the copolymer and the solid grade oligomer. Methods of making and using the barrier composition are also disclosed.

The first monomer can include any aromatic monomer known in the art. In some embodiments, the aromatic monomer can be an ethylenically substituted aromatic compound. Examples of ethylenically substituted aromatic compounds can include vinyl aromatic monomers such as styrene, alkylstyrenes such as α- and p-methylstyrene, α-butylstyrene, 4-n-butylstyrene, 4-n-decylstyrene, and vinyltoluene, or indene, methylindenes, or a combination thereof. In some embodiments, the first monomer is a vinyl aromatic monomer.

The copolymer can be derived from 40% or greater, 45% or greater, 50% or greater, 55% or greater, 60% or greater, 65% or greater, 70% or greater, 75% or greater, 80% or greater, or 85% or greater, by weight of the aromatic monomer. In some embodiments, the copolymer is derived from 95% or less, 90% or less, 85% or less, 80% or less, 75% or less, 70% or less, 65% or less, or 60% or less, by weight of the aromatic monomer. In some embodiments, the copolymer can be derived from 40% to 95%, 40% to 90%, 45% to 90%, 45% to 80%, or 50% to 80%, by weight of the aromatic monomer.

The second monomer can include any ethylenically unsaturated aliphatic monomer known in the art. In some embodiments, the ethylenically unsaturated aliphatic monomers can include conjugated dienes, alkyl (meth)acrylates, or a combination thereof. Examples of conjugated dienes can include straight chain, branched chain and ring form dienes such as butadiene, pentadiene, hexadiene, heptadiene, octadiene, isoprene, 2-ethylbutadiene, Z-tert-butyl butadiene, cyclohexadiene, cyclopentadiene, and combinations thereof. Examples of alkyl (meth)acrylates monomers can include esters of α,β-monoethylenically unsaturated monocarboxylic having 3 to 6 carbon atoms with alkanols having 1 to 12 carbon atoms (e.g., esters of acrylic acid, methacrylic acid, maleic acid, fumaric acid, or itaconic acid, with $C_1$-$C_{12}$. $C_1$-$C_{10}$, $C_1$-$C_8$, or $C_1$-$C_4$ alkanols). In some examples, the alkyl (meth)acrylate monomers can include methyl acrylate, ethyl acrylate, butyl acrylate, 2-ethylhexyl acrylate, methyl methacrylate, or combinations thereof.

The copolymer can be derived from 5% or greater, 10% or greater, 15% or greater, 200 or greater, 25% or greater, or 30% or greater, by weight of the second monomer. In some embodiments, the copolymer can be derived from 600 or less, 55% or less, 50% or less, 45% or less, 40% or less, or 35% or less, by weight of the second monomer. In some embodiments, the copolymer can be derived from 5% to 60%, 10% to 60%, 10% to 50%, 15% to 600/0, or 15% to 50%, by weight of the second monomer.

The copolymer can be further derived from additional monomers. Examples of additional monomers include carboxylic acid monomers such as α,β-monoethylenically unsaturated mono- and dicarboxylic acids, citraconic acid, styrene carboxylic acid, (meth)acrylic acid, itaconic acid, fumaric acid, crotonic acid, dimethacrylic acid, ethylacrylic acid, allylacetic acid, vinylacetic acid, maleic acid, mesaconic acid, methylenemalonic acid, and citraconic acid. Further examples of additional monomers include anhydrides of α,β-monoethylenically unsaturated mono- and dicarboxylic acids (e.g., maleic anhydride, itaconic anhydride, and methylmalonic anhydride); (meth)acrylonitrile; vinyl and vinylidene halides (e.g., vinyl chloride and vinylidene chloride); vinyl esters of $C_1$-$C_{18}$ mono- or dicarboxylic acids (e.g., vinyl acetate, vinyl propionate, vinyl n-butyrate, vinyl laurate and vinyl stearate); $C_1$-$C_4$ hydroxyalkyl esters of $C_3$-$C_6$ mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with $C_1$-$C_{18}$ alcohols alkoxylated with from 2 to 50 mol of ethylene oxide, propylene oxide, butylene oxide or mixtures thereof (e.g., hydroxyethyl (meth)acrylate, hydroxypropyl (meth)acrylate, and methylpolyglycol acrylate); and monomers containing glycidyl groups (e.g., glycidyl methacrylate).

Further examples of additional monomers or co-monomers that can be used include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g., allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate and sulfopropyl methacrylate); phosphorus-containing monomers (e.g., dihydrogen phosphate esters of alcohols in which the alcohol contains a polymerizable vinyl or olefenic group, allyl phosphate, phosphoalkyl(meth)acrylates such as 2-phosphoethyl(meth)acrylate (PEM), 2-phosphopropyl(meth)acrylate, 3-phosphopropyl (meth)acrylate, and phosphobutyl(meth)acrylate, 3-phospho-2-hydroxypropyl(meth)acrylate, mono- or di-phosphates of bis(hydroxymethyl) fumarate or itaconate; phosphates of hydroxyalkyl(meth)acrylate, 2-hydroxyethyl(meth)acrylate, 3-hydroxypropyl(meth)acrylate, ethylene oxide condensates of (meth)acrylates, $H_2C=C(CH_3)COO(CH_2CH_2O)_nP(O)(OH)_2$, and analogous propylene and butylene oxide condensates, where n is an amount of 1 to 50, phosphoalkyl crotonates, phosphoalkyl maleates, phosphoalkyl fumarates, phosphodialkyl (meth)acrylates, phosphodialkyl crotonates, vinyl phosphonic acid, allyl phosphonic acid, 2-acrylamido-2methylpropanephosphinic acid, α-phosphonostyrene, 2-methylacrylamido-2-methylpropanephosphinic acid, (hydroxy)phosphinylalkyl(meth)acrylates, (hydroxy)phosphinylmethyl methacrylate, and combinations thereof); alkylaminoalkyl (meth)acrylates or alkylaminoalkyl(meth) acrylamides or quaternization products thereof (e.g., 2-(N, N-dimethylamino)ethyl (meth)acrylate, 3-(N,N-dimethylamino)propyl (meth)acrylate, 2-(N,N,N-trimethylammonium)ethyl (meth)acrylate chloride, 2-dimethylaminoethyl(meth)acrylamide, 3-dimethylaminopropyl(meth)acrylamide, and 3-trimethylammoniumpropyl (meth)acrylamide chloride); allyl esters of C1-C30 monocarboxylic acids; N-vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine); monoalkyl itaconates; monoalkyl maleates; hydrophobic branched ester monomers; monomers containing silyl groups (e.g., trimethoxysilylpropyl methacrylate), vinyl esters of branched mono-carboxylic acids having a total of 8 to 12 carbon atoms in the acid residue moiety and 10 to 14 total carbon atoms such as, vinyl 2-ethylhexanoate, vinyl neo-nonanote, vinyl neo-decanoate, vinyl neo-undecanoate, vinyl neo-dodecanoate and mixtures thereof, and copolymerizable surfactant monomers (e.g., those sold under the trademark ADEKA REASOAP).

The additional monomers used to produce the copolymers can also include a crosslinking monomer. For example, the crosslinking monomer can include diacetone acrylamide (DAAM) or a self-crosslinking monomer such as a monomer comprising 1,3-diketo groups or a silane crosslinker. Examples of monomers comprising 1,3-diketo groups include acetoacetoxyalkyl (meth)acrylates, such as acetoacetoxyethyl (meth)acrylate (AAEM), acetoacetoxypropyl (meth)acrylate, acetoacetoxybutyl (meth)acrylate, and 2,3-di(acetoacetoxy)propyl (meth)acrylate; allyl acetoacetate; vinyl acetoacetate; and combinations thereof. Examples of suitable silane crosslinkers include 3-methacryloxypropyl trimethoxysilane, 3-mercaptopropyl trimethoxysilane, vinyl-triethoxysilane, and polyvinyl-siloxane oligomers such as DYNASYLAN 6490, a polyvinyl siloxane oligomer derived from vinyltrimethoxysilane, and DYNASYLAN 6498, a polyvinyl siloxane oligomer derived from vinyltriethoxysilane, both commercially available from Evonik Degussa GmbH (Essen, Germany). Crosslinkable monomers as described herein can further include monomers such as divinylbenzene; 1,4-butanediol diacrylate; methacrylic acid anhydride; and monomers containing urea groups (e.g., ureidoethyl (meth)acrylate, acrylamidoglycolic acid, and methacrylamidoglycolate methyl ether). Additional examples of crosslinkable monomers include N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals. Other exemplary crosslinkable monomers include diesters or triesters of dihydric and trihydric alcohols with α,β-monoethylenically unsaturated monocarboxylic acids (e.g., di(meth)acrylates, tri(meth)acrylates), of which in turn acrylic acid and methacrylic acid can be employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, vinyl methacrylate, vinyl acrylate, allyl methacrylate, allyl acrylate, diallyl maleate, diallyl fumarate and methylenebisacrylamide. In some examples, the copolymer can be derived from 0 to 5% by weight of one or more crosslinkable monomers. In some embodiments, the crosslinking agent can be used in an amount of from 0.01% to 5% by weight, based on the weight of the copolymer.

The additional monomers in the copolymers disclosed herein can be in small amounts (e.g., 10% by weight or less, 7.5% by weight or less, 5% by weight or less, 4% by weight or less, 3% by weight or less, 2% by weight or less, 1.5% by weight or less, 1% by weight or less, or 0.5% by weight or less).

In some embodiments, the copolymer is derived from only one first monomer and one or more second monomers. For example, the copolymer can be derived from styrene and butadiene. In some embodiments, the copolymer can be derived from styrene and one or more esters of α,β-monoethylenically unsaturated monocarboxylic acid monomers such as butyl acrylate, 2-ethylhexyl acrylate, ethyl acrylate, methyl acrylate, methyl methacrylate, or combinations thereof.

The weight average molecular weight ($M_w$) of the copolymers present in the barrier composition can be at least 200 kDa (e.g., from 250 kDa to 1,000 kDa, from 250 kDa to 750 kDa, from 250 kDa to 500 kDa). In some embodiments, the weight average molecular weight of the copolymers present in the composition can be 200 kDa or greater, 225 kDa or greater, 250 kDa or greater, 275 kDa or greater, 300 kDa or greater, 325 kDa or greater, 350 kDa or greater, 375 kDa or greater, or 400 kDa or greater.

The number average molecular weight ($M_n$) of the copolymers present in the composition can be at least 200 kDa (e.g., from 250 kDa to 1,000 kDa, from 250 kDa to 750 kDa, from 250 kDa to 500 kDa). In some embodiments, the number average molecular weight of the copolymers present in the composition can be 200 kDa or greater, 225 kDa or greater, 250 kDa or greater, 275 kDa or greater, 300 kDa or greater, 325 kDa or greater, 350 kDa or greater, 375 kDa or greater, or 400 kDa or greater.

The barrier composition also comprises a solid grade oligomer. In some embodiments, the solid grade oligomer includes an ammonium salt of a modified acrylic copolymer, an amine salt of a modified acrylic copolymer, or a combination thereof. Examples of modified acrylic copolymers include polymers derived from (meth)acrylic acid monomers, (meth)acrylate monomers, vinyl aromatic monomers, or combinations thereof. In some embodiments, the solid grade oligomer can be derived from styrene, alkylstyrenes such as α-methyl styrene, α,β-monoethylenically unsaturated carboxylic acids having 3 to 6 carbon atoms, salts or esters of α,β-monoethylenically unsaturated carboxylic acids having 3 to 6 carbon atoms with alkanols having 1 to 12 carbon atoms (e.g., esters of acrylic acid, methacrylic acid, maleic acid, fumaric acid, or itaconic acid, with $C_1$-$C_{20}$, $C_1$-$C_{12}$, $C_1$-$C_8$, or $C_1$-$C_4$ alkanols), alkoxy (meth) acrylates, or a combination thereof. Examples of salts or esters of α,β-monoethylenically unsaturated carboxylic acids can include butyl acrylate, 2-ethylhexyl acrylate, ethyl acrylate, methyl acrylate, methyl methacrylate, alkoxy (meth)acrylates such as carbitol methacrylate, or combinations thereof. In some embodiments, the solid grade oligomer is an ammonium salt of a styrene-acrylic copolymer, an amine salt of a styrene-acrylic copolymer, or a combination thereof. Exemplary commercially available solid grade oligomers include Joncryl resins available from BASF Corporation. In some embodiments, the SGO resin is Food and Drug Administration (FDA) compliant for use in food packaging. In particular, FDA standards for compliance are provided in 21 C.F.R. § 176.170 and 21 C.F.R. § 176.180 which are incorporated herein by reference. FDA regulations embodied in 21 CFR § 176.170 and 21 CFR § 176.180 indicate the types of paper coating composition components, including components of polymers used in such compositions, which can be utilized to coat paper for eventual use with food products. The SGO resin in the barrier compositions described herein can be formulated from materials which comply with these FDA paper coating for food contact regulations.

The weight average molecular weight ($M_w$) of the solid grade oligomer present in the composition can be 20 kDa or less (e.g., from 2 kDa to 20 kDa, from 2 kDa to 15 kDa, from 2 kDa to 10 kDa). In some embodiments, the weight average molecular weight of the copolymers present in the composition can be 20 kDa or less, 18 kDa or less, 15 kDa or less, 12 kDa or less, 10 kDa or less, 8 kDa or less, or 7 kDa or less.

The number average molecular weight ($M_n$) of the solid grade oligomer present in the composition can be 20 kDa or less (e.g., from 2 kDa to 20 kDa, from 2 kDa to 15 kDa, from 2 kDa to 10 kDa). In some embodiments, the number average molecular weight of the copolymers present in the composition can be 20 kDa or less, 18 kDa or less, 15 kDa or less, 12 kDa or less, 10 kDa or less, 8 kDa or less, or 7 kDa or less.

The solid grade oligomer can react during the polymerization of the first monomer and the second monomer and become covalently linked to the copolymer. In some embodiments, the solid grade oligomer is grafted to the copolymer. In some embodiments, the barrier composition is derived from 8%-40% by weight solid grade oligomer (e.g., from 10%-40%, from 10%-35%, from 15%-35%, or from 20%-30%), based on the solids in the composition.

In some embodiments, the barrier composition is derived from 5%-85% by weight styrene (e.g., from 10%-70, from 15%-65%, from 20%-60%, or from 25%-50%), from 5%-60% by weight butadiene (e.g., from 10%-60%, from 15%-65%, from 25%-60%, from 25%-50%, or from 30%-45%), and from 10%-40% by weight solid grade oligomer (e.g., from 10%-35%, from 15%-35%, or from 20%-30%). In some embodiments, the copolymer can be derived from one or more monomers in addition to styrene and butadiene such as (meth)acrylonitrile, (meth)acrylamide and/or a carboxylic acid monomer (e.g., (meth)acrylic acid).

In some embodiments, the first monomer includes styrene and the second monomer includes a (meth)acrylate-based monomer. For example, the (meth)acrylic acid-based monomer can include esters of (meth)acrylic acid such as butyl acrylate, 2-ethylhexyl acrylate, ethyl acrylate, methyl acrylate, or methyl methacrylate. In some embodiments, the copolymer is derived from 5%-85% by weight styrene (e.g., from 10%-70%, from 15%-65%, from 20%-60%, or from 25%-50%), from 5%-60% by weight (meth)acrylate-based monomer (e.g., from 10%-60%, from 15%-65%, from 25%-60%, from 25%-50%, or from 30%-45%), and from 10%-40% by weight solid grade oligomer (e.g., from 10%-35%, from 15%-35%, or from 20%-30%). In some embodiments, the copolymer can be derived from one or more monomers in addition to styrene and a (meth)acrylate-based monomer such as (meth)acrylamide, a carboxylic acid monomer (e.g., (meth)acrylic acid), a phosphate-based monomer (e.g., PEM), an acetoacetoxy monomer (e.g., AAEM), or another functional monomer.

The barrier compositions disclosed herein can be prepared by any polymerization method known in the art. In some embodiments, the compositions disclosed herein are prepared by a dispersion, a mini-emulsion, or an emulsion polymerization. For example, the barrier compositions disclosed herein can be prepared by polymerizing a first and a second monomer in the presence of a solid grade oligomer using free-radical aqueous emulsion polymerization. The emulsion polymerization can be an aqueous emulsion comprising water, a first monomer, a second monomer, a solid grade oligomer, optionally an emulsifier, or combinations thereof. In some embodiments, the polymerization medium is an aqueous medium. Solvents other than water can be used in the emulsion. The emulsion polymerization can be carried out either as a batch, semi-batch, or continuous process. In some embodiments, a portion of the monomers can be heated to the polymerization temperature and partially polymerized, and the remainder of the polymerization batch can be subsequently fed to the polymerization zone continuously, in steps or with superposition of a concentration gradient. The process can use a single reactor or a series of reactors as would be readily understood by those skilled in the art. For example, a review of heterophase polymerization techniques is provided in M. Antonelli and K. Tauer, Macromol. Chem. Phys. 2003, vol. 204, p 207-19.

An aqueous dispersion comprising the copolymer and the solid grade oligomer can be prepared by first charging a reactor with water, a solid grade oligomer, and optionally at least one surfactant. A seed latex, though optional, can be included in the reactor to help initiate polymerization and helps produce a polymer having a consistent particle size. Any seed latex appropriate for the specific monomer reaction can be used such as a polystyrene seed. The initial charge can also include a chelating or complexing agent such as ethylenediamine tetraacetic acid (EDTA). Other compounds such as buffers can be added to the reactor to provide the desired pH for the emulsion polymerization reaction. For example, bases or basic salts such as KOH or tetrasodium pyrophosphate can be used to increase the pH whereas acids or acidic salts can be used to decrease the pH. The initial charge can then be heated to a temperature at or near the reaction temperature, for example, a reaction temperature between 50° C. and 100° C. (e.g., between 55° C. and 95° C., between 58° C. and 90° C., between 61° C. and 85° C., between 65° C. and 80° C., or between 68° C. and 75° C.).

After the initial charge, a first monomer, and a second monomer that are to be used in the polymerization of the copolymer can be continuously fed to the reactor in one or more monomer feed streams. The monomers can be supplied as a pre-emulsion in an aqueous medium, particularly if acrylate monomers are used in the polymerization. An initiator feed stream can be also continuously added to the reactor at the time the monomer feed stream is added although it may also be desirable to include at least a portion of the initiator solution to the reactor before adding a monomer pre-emulsion if one is used in the process. The monomer and initiator feed streams are typically continuously added to the reactor over a predetermined period of time (e.g., 1.5-5 hours) to cause polymerization of the monomers and to thereby produce the copolymer dispersion. Optionally, a surfactant can be added at this time as part of either the monomer stream or the initiator feed stream although they can be provided in a separate feed stream. Furthermore, one or more buffers can be included in either the monomer or initiator feed streams or provided in a separate feed stream to modify or maintain the pH of the reactor.

The monomer feed stream can include one or more monomers. The first and the second monomers can be fed in one or more feed streams with each stream including one or more of the monomers being used in the polymerization process. For example, styrene and butadiene (when used) can be provided in separate monomer feed streams or can be added as a pre-emulsion. It can also be advantageous to delay the feed of certain monomers to provide certain polymer properties or to provide a layered or multiphase structure (e.g., a core/shell structure).

The molecular weight of the copolymers can be adjusted by adding a small amount of molecular weight regulators, for example, 0.01 to 4% by weight, based on the monomers being polymerized. Particular regulators which can be used include organic thio compounds (e.g., tert-dodecylmercaptan), allyl alcohols and aldehydes.

The initiator feed stream can include at least one initiator or initiator system that is used to cause the polymerization of the monomers in the monomer feed stream. The initiator stream can also include water and other desired components appropriate for the monomer reaction to be initiated. The initiator can be any initiator known in the art for use in emulsion polymerization such as azo initiators; ammonium, potassium or sodium persulfate; or a redox system that typically includes an oxidant and a reducing agent. Commonly used redox initiation systems are described, e.g., by A. S. Sarac in *Progress in Polymer Science* 24, 1149-1204 (1999). Exemplary initiators include azo initiators and aqueous solutions of sodium persulfate. The initiator stream can optionally include one or more buffers or pH regulators.

In addition to the monomers and initiator, optionally, an anionic or nonionic surfactant (i.e., emulsifier) can be fed to the reactor. The surfactant can be provided in the initial charge of the reactor, provided in the monomer feed stream, provided in an aqueous feed stream, provided in a pre-emulsion, provided in the initiator stream, or a combination thereof. The surfactant can also be provided as a separate continuous stream to the reactor. The surfactant can be provided in an amount of 1%-5% by weight, based on the total weight of monomer and surfactant. In some embodiments, the surfactant is provided in an amount less than 2% by weight.

Once polymerization is completed, the polymer dispersion can be chemically stripped thereby decreasing its residual monomer content. This stripping process can include a chemical stripping step and/or a physical stripping step. In some embodiments, the polymer dispersion is chemically stripped by continuously adding an oxidant such as a peroxide (e.g., t-butylhydroperoxide) and a reducing agent (e.g., sodium acetone bisulfite), or another redox pair to the reactor at an elevated temperature and for a predetermined period of time (e.g., 0.5 hours). Suitable redox pairs are described by A. S. Sarac in *Progress in Polymer Science* 24, 1149-1204 (1999). An optional defoamer can also be added if needed before or during the stripping step. In a physical stripping step, a water or steam flush can be used to further eliminate the non-polymerized monomers in the dispersion. Once the stripping step is completed, the pH of the polymer dispersion can be adjusted and a biocide or other additives can be added. Cationic, anionic, and/or amphoteric surfactants or polyelectrolytes may optionally be added after the stripping step or at a later time if desired in the end product to provide a cationic or anionic polymer dispersion.

Once the polymerization reaction is complete, and the stripping step is completed, the temperature of the reactor can be reduced.

In some embodiments, the particles of the resultant copolymer dispersion have an volume-average particle size from 20 nm to 500 nm (e.g., from 40 nm to 480 nm, from 60 nm to 460 nm, from 80 nm to 440 nm, from 100 nm to 420 nm, from 120 nm to 400 nm, from 140 nm to 380 nm, from 160 nm to 360 nm, from 180 nm to 340 nm, from 200 nm to 320 nm, or from 220 nm to 300 nm, or from 240 nm to 280 nm). In some embodiments, the particles of the resultant copolymer dispersion have a number average particle size of 20 nm to 300 nm (e.g., from 30 nm to 290 nm, from 40 nm to 280 nm, from 50 nm to 270 nm, from 60 nm to 260 nm, from 70 nm to 250 nm, from 80 nm to 240 nm, from 90 nm to 230 nm, from 100 nm to 220 nm, from 110 nm to 210 nm, from 120 nm to 200 nm, from 130 nm to 190 nm, or from 140 nm to 180 nm). The particle size measurements are made using dynamic light scattering measurements using the Nicomp Model 380 available from Particle Sizing Systems, Santa Barbara, Calif.

The barrier composition can be produced as a dispersion that includes, as a disperse phase, particles of the copolymer dispersed in water. The barrier composition can be prepared with a total solids content of from 20% to 70% by weight (e.g., 25% to 65% by weight, 35% to 60% by weight, or 45% to 50% by weight). In some embodiments, the barrier composition can have a total solids content of 45% or greater by weight. Despite the higher solids content of the aqueous dispersions, the aqueous dispersions disclosed herein can have a Brookfield viscosity of 100 cP to 2,500 cP (e.g., from 100-1,500 cP or from 500 cP to 1,500 cP) at 20° C. The viscosity can be measured using a viscometer with a #2 spindle at 50 rpm at 20° C.

The barrier composition can further include one or more additives. The one or more additives, in some embodiments, can include mineral fillers and/or pigments. Mineral fillers generally have a substantial proportion of particles having a particle size greater than 2 microns whereas pigments have a substantial proportion of particles having a particle size less than 2 microns. In some embodiments, the mineral fillers and/or pigments can be added to impart certain properties to a paper such as smoothness, whiteness, increased density or weight, decreased porosity, increased opacity, flatness, glossiness, decreased blocking resistance, barrier properties, and the like. The mineral fillers and/or pigments can include calcium carbonate (precipitated or ground), kaolin, clay, talc, diatomaceous earth, mica, barium sulfate, magnesium carbonate, vermiculite, graphite, carbon black, alumina, silicas (fumed or precipitated in powders or dispersions), colloidal silica, silica gel, titanium oxides, aluminum hydroxide, aluminum trihydrate, satine white, and magnesium oxide. The pigment can also undergo a thermal treatment process and then, with or without the thermal treatment, can be treated with a material that will facilitate repulsion of water and/or significantly slow the rate of diffusion of the target species (high surface tension or contact angle). In some embodiments, the pigment can be treated with a copolymer such as a styrene acrylic copolymer derived from monomers including styrene, (meth)acrylic acid, (meth)acrylic acid esters, (meth)acrylamide, (meth)acrylonitrile, and mixtures thereof. For example, the styrene acrylic copolymer can include styrene and at least one of (meth)acrylic acid, itaconic acid, methyl (meth)acrylate, ethyl (meth)acrylate, n-butyl (meth)acrylate, isobutyl (meth)acrylate, tert-butyl (meth)acrylate, 2-ethylhexyl (meth)acrylate, (meth)acrylamide, (meth)acrylonitrile, and hydroxyethyl (meth)acrylate.

The dispersion can include exclusively mineral fillers or pigments or can include a blend of mineral fillers and pigments (e.g., weight ratios of 90:10, 80:20, 70:30, 60:40, 50:50, 40:60, 30:70, 20:80 or 10:90). The barrier composition can include from 1% to 60% by weight (e.g., 1% to 55% by weight, 1% to 50% by weight, or 5% to 50% by weight) of mineral fillers and/or pigments.

The pigment can be provided as a stable slurry that can contain any of the combination of pigments described above, optionally a dispersant, a defoamer, a lubricant, a thickener, buffering agents, salts, preservatives, wetting agents, protective colloids, or biocides. The dispersant can be a latex, starch or polyvinyl alcohol (PVAL) such as Dispex N 40 V. Natural thickening aids such as starch or protein or synthetic polymers such as STEROCOLL FS (available from BASF Corporation) can be used to thicken/stabilize the pigment system. The barrier composition may also contain a binder. The binder can be a styrene acrylic resin emulsion (SA), a styrene butadiene latex (SB latex), PVAL, starch, protein and a combination thereof, which can also contribute to the barrier properties.

In some embodiments, the barrier composition is free of a surfactant. In some embodiments, the barrier composition is free of a low molecular weight surfactant. In some embodiments, the barrier composition is free of surfactants having a molecular weights of less than or equal to 1,500 g/mol (e.g., 1,200 g/mol or less, 1,000 g/mol or less, or 800 g/mol or less, or 500 g/mol or less). Without wishing to be bound by theory, it is believed that the copolymer dispersion is stabilized by electrosteric effects, thus not requiring a surfactant.

The barrier compositions disclosed herein can be used with any substrate to impart water, moisture, grease, oil, and/or oxygen resistance. In some embodiments, the substrate can be a cellulose-based substrate, such as paper, paper board, or cardboard. The cellulose-based substrates can include paper cups, including for instance, disposable or recyclable paper cups, paper bags for dry foods, such as, for example, coffee, tea, soup powders, sauce powders; for liquids, such as, for example, cosmetics, cleaning agents, beverages; of tube laminates; of paper carrier bags; of paper laminates and coextrudates for ice cream, confectionery (e.g., chocolate bars and muesli bars), of paper adhesive tape; of cardboard cups (e.g., paper cups), yogurt pots, souffle cups; of meal trays, or meat trays; of wound cardboard containers (e.g., cans, drums), of wet-strength cartons for outer packaging (e.g., wine bottles, food); of fruit boxes of coated cardboard; of fast food plates; of clamp shells; of beverage cartons and cartons for liquids, such as detergents and cleaning agents, frozen food cartons, ice packaging (e.g., ice cups, wrapping material for conical ice cream wafers); of paper labels; or of flower pots and plant pots.

In some embodiments, the barrier composition is coated on the substrate. For example, the barrier composition can be provided as a coating on a paper web. The barrier composition can have a coating weight of 2 g/m$^2$ or greater (e.g., 3 g/m$^2$ or greater, 4 g/m$^2$ or greater, 5 g/m$^2$ or greater, 6 g/m$^2$ or greater, 7 g/m$^2$ or greater, 8 g/m$^2$ or greater, 9 g/m$^2$ or greater, 10 g/m$^2$ or greater, 11 g/m$^2$ or greater, 12 g/m$^2$ or greater, 13 g/m$^2$ or greater, 14 g/m$^2$ or greater, 15 g/m$^2$ or greater, 16 g/m$^2$ or greater, 17 g/m$^2$ or greater, 18 g/m$^2$ or greater, 19 g/m$^2$ or greater, 20 g/m$^2$ or greater, 21 g/m$^2$ or greater, 22 g/m$^2$ or greater, 23 g/m$^2$ or greater, 24 g/m$^2$ or greater, 25 g/m$^2$ or greater, 26 g/m$^2$ or greater, 27 g/m$^2$ or greater, 28 g/m$^2$ or greater, or 29 g/m$^2$ or greater). The barrier composition can have, in some embodiments, a coating weight of 30 g/m$^2$ or less (e.g., 29 g/m$^2$ or less, 28 g/m$^2$ or less, 27 g/m$^2$ or less, 26 g/m$^2$ or less, 25 g/m$^2$ or less, 24 g/m$^2$ or less, 23 g/m$^2$ or less, 22 g/m$^2$ or less, 21 g/m$^2$ or less, 20 g/m$^2$ or less, 19 g/m$^2$ or less, 18 g/m$^2$ or less, 17 g/m$^2$ or less, 16 g/m$^2$ or less, 15 g/m$^2$ or less, 14 g/m$^2$ or less, 13 g/m$^2$ or less, 12 g/m$^2$ or less, 11 g/m$^2$ or less, 10 g/m$^2$ or less, 9 g/m$^2$ or less, 8 g/m$^2$ or less, 7 g/m$^2$ or less, 6 g/m$^2$ or less, 5 g/m$^2$ or less, 4 g/m$^2$ or less, or 3 g/m$^2$ or less). The barrier composition can have, in some embodiments, a coating weight of from 2 g/m$^2$ to 30 g/m$^2$ (e.g., 3 g/m$^2$ to 30 g/m$^2$, 4 g/m$^2$ to 30 g/m$^2$, 5 g/m$^2$ to 30 g/m2, or 10 g/m$^2$ to 25 g/m$^2$). The coating weight can be reported in units of grams of coating per square meter of cellulose-based substrate, and can be calculated directly by the amount of coating applied and the surface area of the cellulose-based substrate that the coating is applied to. The aqueous-based polymer coating, in some embodiments, can be applied in an amount of less than 15% by weight based on the weight of the coated cellulose-based substrate. In some embodiments, the barrier composition can be from 0.01%-5% (e.g., from 0.1%-5%, from 0.5%-5%, from 0.1%-4%, from 0.1%-3%, from 0.1%-2.5%, or 0.1% or greater, 0.5% or greater, 1% or greater, 1.5% or greater), by weight of the substrate.

The barrier composition can have, in some embodiments, a thickness of from 0.4 mils or greater (e.g., 0.5 mils or greater, 0.6 mils or greater, 0.7 mils or greater, 0.8 mils or greater, 0.9 mils or greater, 1 mils or greater, 1.1 mils or greater, 1.2 mils or greater, 1.3 mils or greater, 1.4 mils or greater, 1.5 mils or greater, 1.6 mils or greater, 1.7 mils or greater, 1.8 mils or greater, 1.9 or greater). The barrier composition can have, in some embodiments, a thickness of 2 mils or less (e.g., 1.9 mils or less, 1.8 mils or less, 1.7 mils or less, 1.6 mils or less, 1.5 mils or less, 1.4 mils or less, 1.3 mils or less, 1.2 mils or less, 1 mils or less, 0.9 mils or less, 0.8 mils or less, 0.7 mils or less, 0.6 mils or less, or 0.5 mils or less). The barrier composition can have, in some embodiments, a thickness of from 0.4 mils to 2 mils (e.g., from 0.5 mils to less than 1.8 mils, from 0.6 mils to 1.6 mils, or from 0.7 mils to 1.5 mils). The coating thickness can be calculated based on the density of the coating and the weight of the coated cellulose-based substrate.

The barrier composition coating can be on one or more surfaces of the substrate. For example, the present disclosure also relates to paper cups. The paper cup can have an interior surface, an exterior surface, a bottom portion, and a side portion. The barrier composition can be on a first surface and/or a second surface of the paper cup. The first surface, in some embodiments, comprises one or more of an interior surface of the side portion and/or an interior surface of the bottom portion. In some embodiments, only a portion (e.g., 10% or greater, 20% or greater, 30% or greater, 40% or greater, 50% or greater, 60% or greater, 70% or greater, 80% or greater, 90% or greater, or all) of the interior surface is coated. In some embodiments, the entire interior surface is coated. The second surface, in some embodiments, comprises one or more of an exterior surface of the side portion and/or an exterior surface of the bottom portion. In some embodiments, only a portion (e.g., 10% or greater, 20% or greater, 30% or greater, 40% or greater, 50% or greater, 60% or greater, 70% or greater, 80% or greater, 90% or greater, or all) of the exterior surface is coated. In some embodiments, the entire exterior surface is coated.

The barrier composition can be coated onto a cellulose-based substrate using a paper machine in a mill or by a printing method.

In some embodiments, the barrier composition is provided throughout the substrate, for example, a paper web formed of cellulosic fibers. In some embodiments, the barrier composition can be from 4%-30% by weight of the substrate (e.g., from 5%-30%, from 5%-29%, from 5%-28%, from 5%-27%, from 5%-26%, from 5%-20%, or 4% or greater, 5% or greater, 6% or greater, 7% or greater, 8% or greater, 9% or greater, or 10% or greater), by weight of the substrate.

The barrier composition can be added to a substrate, such as a cellulose-based substrate using any method known in the art for adding a barrier composition to a substrate. In some embodiments, the method can include coating a paper web comprising cellulosic fibers with an aqueous dispersion comprising the barrier composition. In some embodiments, the method can include spraying an aqueous dispersion comprising the barrier composition on a paper web. In some embodiments, the method can include mixing an aqueous dispersion comprising the barrier composition with an aqueous slurry comprising the cellulosic fibers to form a mixture, and forming a paper web form the mixture of the cellulosic fibers and the barrier composition.

As discussed above, the barrier composition can impart water, moisture, grease, oil, and/or oxygen resistance to the substrate compared to applications that do not include the barrier composition. The substrates may also exhibit reduced or eliminated leaks or staining. Liquid-water and water-vapor resistance of a substrate comprising the barrier composition can be tested with the Cobb method, described by TAPPI T 441 (2001), which is incorporated by reference herein in its entirety. This method determines the amount of liquid water or moisture vapor absorbed by paper, paperboard, and corrugated fiberboard in a specified time under standardized conditions. In some embodiments, the coated substrates described herein would pass the water-resistance test set forth in this test method. Water absorptiveness can be a function of various characteristics of paper or paperboard including, but not limited to, sizing and porosity.

The substrate comprising the barrier composition can exhibit a Cobb value of 0.01 g/m$^2$ to 25 g/m$^2$ (e.g., 25 g/m$^2$ or less, 20 g/m$^2$ or less, 15 g/m$^2$ or less, 10 g/m$^2$ or less, or 5 g/m$^2$ or less). The substrate comprising the barrier composition can exhibit a moisture vapor transmission rate (MVTR) of 35 g/m$^2$ or less per 24 hours when measured at 25° C. and 50 RH %. For example, the substrate comprising the barrier composition can exhibit a moisture vapor transmission rate of 32 g/m$^2$ or less, 30 g/m$^2$ or less, 27 g/m$^2$ or less, 25 g/m$^2$ or less, 22 g/m$^2$ or less, 20 g/m$^2$ or less, 18 g/m$^2$ or less, 17 g/m$^2$ or less, or 15 g/m$^2$ or less. In some embodiments, the substrate comprising the barrier composition can exhibit a moisture vapor transmission rate of 5 g/m$^2$ or greater or 10 g/m$^2$ or greater.

Further, the substrate comprising the barrier composition described herein may exhibit minimal tendencies of blocking (i.e., the adhesion of the coated surface to another coated surface, or the adhesion of the coated surface to an uncoated surface) of the extrusion coated paper when wound onto paper rolls, before cutting/forming into finished paper products. Blocking resistance can be tested using the I.C. Block tester, described by ASTM WK20008. Samples can be given a rating of 1 to 5, based on the following scale: 1-very light tack, 2-light tack, 3-heavy tack, 4-sticky, about 25% fiber tear, and 5-more than 25% fiber tear.

Table 1 shows an exemplary barrier composition and the function of each ingredient.

TABLE 1

Barrier composition.

| Ingredients | Parts per dry weight of coating formulation | Function |
|---|---|---|
| Copolymer Dispersion | 75 | Binder - main barrier |
| Pigment Slurry Nuclay | 25 | Platy pigment to lower cost, good barrier and provide blocking |
| Sterocoll FS | 0.6 | Thickener to obtain adequate low shear viscosity |
| Calsan 50 | 1.2 | Lubricant to improve blocking |
| Rhodoline 635 | 0.05 | Defoamer to minimize foam and pinholes |
| Dispex N 40 V | 0.1 | Dispersant to ensure pigment is fully dispersed |
| Sodium Hydroxide 10% | To pH 8.5 | Adjust pH to give good machine runnability |

By way of non-limiting illustration, an example of certain embodiments of the present disclosure is given below. Unless indicated otherwise, parts are parts by weight, temperature is in ° C. or is at ambient temperature, and pressure is at or near atmospheric.

Examples 1-6: Barrier Properties of a Copolymer Formulation

A copolymer (EX 1) derived from 65 parts by weight styrene, 35 parts by weight butadiene, and 35 parts by weight solid grade oligomer was produced. The solid grade oligomer was derived from a salt of a styrene-acrylic copolymer of weight average molecular weight of less than 20 Daltons. A styrene feed, a butadiene feed, an initiator feed comprising an aqueous solution of sodium persulfate initiator (0.82 parts by weight of the total monomers), were added over 4.5 to 5 hours to a pre-heated reactor (85° C.) containing water. The temperature was maintained at 85° C. throughout the polymerization reaction. Following the polymerization process, the latex dispersion was steam stripped of the residual monomers with water (800 mL) and other chemicals to provide an aqueous dispersion with low residual monomer levels. Following stripping, 1.4% Acticide® MV (12 g) was added to the copolymer when the temperature was less than 40° C.

Examples 2-6 (EX 2, EX 3, EX 4, EX 5, and EX 6) were prepared in the same manner as Example 1 (EX 1) except with the differences shown in Table 2. The acrylic monomers in Example 2 (EX 2) are methyl methacrylate, butyl acrylate, and 2-ethylhexyl acrylate. The acrylic monomers in Comparative Example 1 (CE 1) are butyl acrylate and acrylonitrile (29 wt. %). The acrylic monomers in Comparative Example 2 (CE 2) are butyl acrylate and acrylonitrile (14 wt. %). Table 2 also illustrates the glass transition temperatures for these compositions and for Comparative Examples 1-4.

TABLE 2

SGO modified styrene-butadiene latexes - physical properties

| Example | SGO Used | SGO amount (ppm) | S (ppm) | BU (ppm) | A (ppm) | $T_g$ (° C.) |
|---|---|---|---|---|---|---|
| EX 1 | Yes | 35 | 65 | 35 | 0 | 19 |
| EX 2 | Yes | 35 | 30 | 0 | 70 | −27 |

TABLE 2-continued

SGO modified styrene-butadiene latexes - physical properties

| Example | SGO Used | SGO amount (ppm) | S (ppm) | BU (ppm) | A (ppm) | $T_g$ (° C.) |
|---|---|---|---|---|---|---|
| EX 3 | Yes | 35 | 60 | 40 | 0 | 6 |
| EX 4 | Yes | 35 | 70 | 30 | 0 | 28 |
| EX 5 | Yes | 35 | 60 | 40 | 0 | 8 |
| EX 6 | Yes | 35 | 60 | 40 | 0 | 6 |
| Comp. Ex. 1 (C1) | None | 0 | 45 | 0 | 55 | 39 |
| Comp. Ex. 2 (C2) | None | 0 | 14 | 0 | 86 | 6 |
| Comp. Ex. 3 (C3) | None | 0 | 67 | 33 | 0 | 18 |
| Comp. Ex. 4 (C4) | None | 0 | 62 | 38 | 0 | 6 |

S = styrene,
BU = butadiene,
A = acrylic monomer,
Tg = glass transition temperature,
ppm = parts per total monomer.

Examples 1-6 and Comparative Examples 1-4 were subjected to the following tests.

Cobb Test (TAPPI T441):

An exemplary method for determining the water absorptiveness of sized (non-bibulous) paper and paperboard includes the following:

1. Cut sample slightly larger than the ring that you will be using.
2. Weigh sample to nearest 0.001 grams (dry weight).
3. Loosen screws and remove rings from the apparatus.
4. Place cut sample on rubber mat with the side to be tested facing upwards.
5. Place the ring on top and lock down.
6. Measure distilled or deionized water (approximately 50 cc for small ring or approximately 100 ml for large ring) into graduated cylinder.
7. Pour liquid into ring and start stopwatch.
8. Time for 60 seconds or desired time.
9. When time has elapsed, empty the ring.
10. Loosen screws and remove ring and sample from rubber mat.
11. Place sample between two pieces of blotter paper and roll with 10 kg (approx.) roller, once forward once back.
12. Weigh sample to nearest 0.001 g immediately after blotting (wet weight)

Calculation:

For the 50 cc ring: Wet Weight−Dry Weight×400=Weight of liquid absorbed, g/m².

For 100 cc ring: Wet Weight−Dry Weight×100=Weight of liquid absorbed, g/m².

Water Vapor Transmission Rate Test (TAPPI Test Method T 464):

An exemplary method for determining the water vapor transmission rate of sized (non-bibulous) paper and paperboard includes the following:

1. Pre-dry anhydrous calcium chloride in a 200° C. oven overnight.
2. Cut test samples from the coated/treated sheet using the sample cutting die.
3. Set temperature and humidity levels on humidity chamber. Allow chamber to reach steady-state.
4. Place approximately 20 g of desiccant inside permeability cup. The exact weight is not essential, however, each cup should contain approximately the same amount of desiccant.
5. Place clear gasket over pins of permeability cup.
6. Center the test sample over the top of the permeability cup with the coated/treated side facing up.
7. Place black gasket over pins of permeability cup, on top of the test sample.
8. Place clamp ring over pins of permeability cup.
9. Screw on top of permeability cup. Hand tighten.
10. Weight each assembled cup.
11. Place the assembled cups in the humidity chamber and allow the conditioned air to circulate over the samples at least 4 hours before starting to weigh the assemblies.
12. Remove each assembly and weigh to the nearest 0.001 g.
13. Repeat the weighings at recorded time intervals, usually 4 hours, until a constant rate of gain is obtained. This can be determined from the data when the increase of mass per unit time becomes constant to within 5% for two successive weighings.
14. Continue the weighings for three days or until the weight gain equals 10% of the initial desiccant weight, whichever comes first.

Calculation

Calculate the water vapor transmission rate (WVTR) as follows:

$$WVTR\ (g/m^2 \cdot day) = 24x/0.0025y,$$

where: x=gain in grams for the time period y, (during constant rate at gain period) and y=time in hours for the gain of x. The quantities x and y can be derived conveniently from a plot of weight gain in grams vs. elapsed time in hours.

Block Resistance (I.C. Blocker Test Procedure):

An exemplary method for determining the blocking characteristics of coated paper/board and the rate of blocking includes the following:

1. Condition test specimens according to TAPPI Method 402 for 24 hr.
2. Cut test samples with paper cutter to dimensions of 2 inches×2 inches.
3. Label each cut sheet separately according to its designation.
4. Place samples in orientation of coated side to uncoated side.
5. Pre-set oven temperature to 50° C.
6. Open I.C. Block testing press. Loosen bolts from all four posts and remove screw assembly.
7. Remove spring and cross shaped metal plate.
8. Place the stack of sheets to be tested inside the base of the testing press.
9. Place the metal cross shaped plate on top of samples.
10. Place the appropriate spring on top of cross shaped plate for psi needed to achieve 60 psi, assemble with samples in place.
11. Adjust all components, spring, metal cross shaped plate, and sample stack to directly line up and down in the center of the press with the pressure screw.
12. While holding all in place, begin applying pressure to all by turning the pressure screw in a clock wise fashion to a spring setting for desired psi.
13. Place the I.C. Block testing press with samples under desired pressure in the 50° C. oven. This should be for a duration of 24 hr.
14. At the end of the time interval (24 hr), remove the I.C. Block testing press with samples from the 50° C. oven.
15. Release the pressure by unscrewing the pressure screw. Remove spring assembly, cross shaped plate, and while keeping the sample stack together, place sample stack in the CTH Room for 30 minutes or until reaching room temperature.

16. Starting with the first sample and making note of each sample on a pad or spread sheet of sample name, number of replicates, coated to uncoated side. Very carefully, one sheet at a time, begin separating the sheets, now making note of the degree of blocking or sticking/adhesion of each sheet to the one below it.

Figure 2:
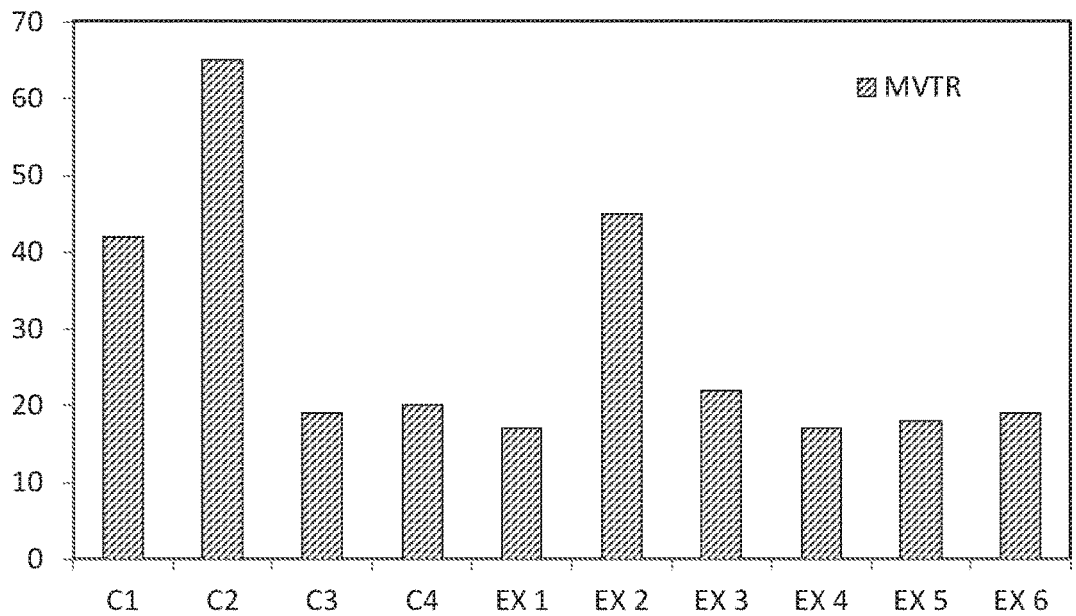
FIG. 2 is a bar graph showing the moisture vapor transmission rate performance at 25° C., 50% RH of the barrier compositions in Examples 1-6 and Comparative Examples 1-4.
Figure 3:
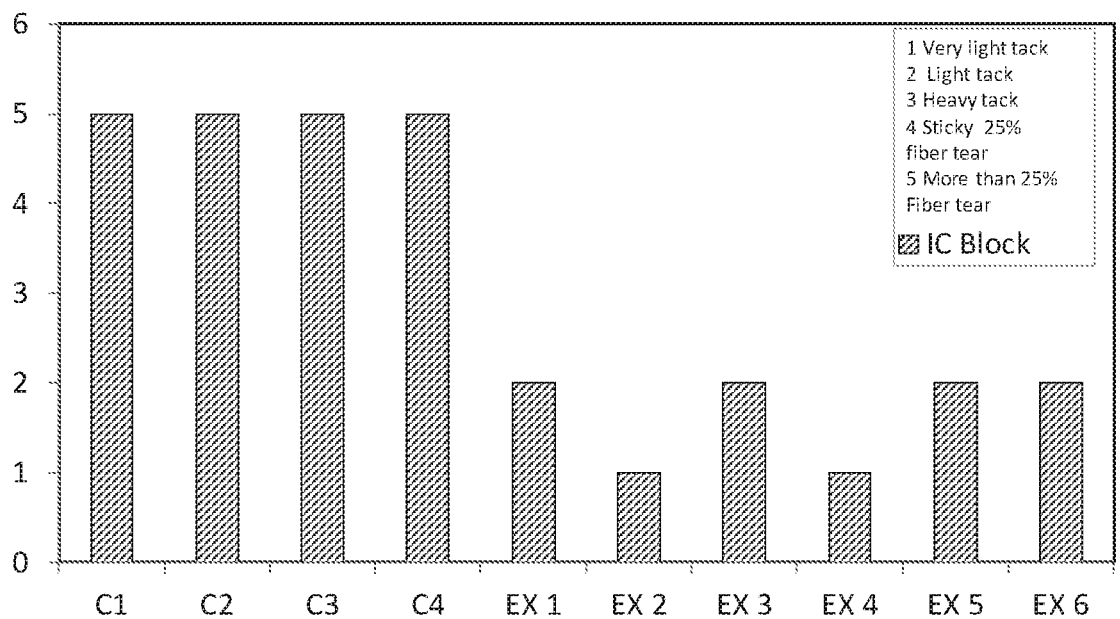
FIG. 3 is a bar graph showing the blocking resistance at 60° C., 60 psi, 24 hours, of the barrier compositions in Examples 1-6 and Comparative Examples 1-4.

17. Using the scale below, determine the degree of blocking and make note for each sheet as it is separated.
 1—the samples fall apart without any force applied—very light tack
 2—light tack
 3—heavy tack
 4—sticky ¼ fiber tear
 5—more than ¼ fiber tear FIG. 1 is a bar graph showing the liquid water resistance of a paper substrate coated with barrier compositions described in Examples 1-6 and Comparative Examples 1-4. FIG. 2 is a bar graph showing the moisture vapor transmission rate of a paper substrate coated with barrier compositions described in Examples 1-6 and Comparative Examples 1-4. FIG. 3 is a bar graph showing the blocking resistance of a paper substrate coated with barrier compositions described in Examples 1-6 and Comparative Examples 1-4.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A barrier composition comprising:
 a copolymer derived from a vinyl aromatic monomer and a second monomer selected from the group consisting of butadiene, alkyl (meth)acrylates, and mixtures thereof, and
 a solid grade oligomer, wherein the vinyl aromatic monomer and the second monomer are polymerized in the presence of the solid grade oligomer, and
 a pigment present in an amount of from 1% to 50% by weight of the barrier composition,
 wherein the solids in the barrier composition comprise 50% by weight or greater of the copolymer and solid grade oligomer.

2. The barrier composition of claim 1, wherein the vinyl aromatic monomer includes styrene, alkylstyrenes, or a combination thereof.

3. The barrier composition of claim 1, wherein the second monomer includes 2-ethylhexyl acrylate, butyl acrylate, ethyl acrylate, methyl acrylate, methyl methacrylate, optionally a crosslinking monomer, or a combination thereof.

4. The barrier composition of claim 1, wherein the solid grade oligomer is derived from monomers including monomers selected from the group consisting of styrene, alkylstyrenes, (meth)acrylic acids or salts or esters thereof, alkoxy (meth)acrylates, and combinations thereof.

5. The barrier composition of claim 1, wherein the solid grade oligomer is an amine salt of a styrene-acrylic copolymer, an ammonium salt of a styrene-acrylic copolymer, or a combination thereof.

6. The barrier composition of claim 1, wherein the copolymer is formed by polymerizing styrene and butadiene in the presence of the solid grade oligomer.

7. The barrier composition of claim 1, wherein the barrier composition is derived from 4%-80% by weight styrene, 4%-80% by weight butadiene, and 10%-45% by weight solid grade oligomer based on the weight of the copolymer and the solid grade oligomer.

8. The barrier composition of claim 1, wherein the copolymer has a weight average molecular weight of 250,000 Daltons to 750,000 Daltons.

9. The barrier composition of claim 1, wherein the solid grade oligomer has a weight average molecular weight of 20,000 Daltons or less.

10. The barrier composition of claim 1, wherein the pigment is clay.

11. The barrier composition of claim 1, wherein the composition is free of a surfactant having a molecular weight of 1,500 g/mol or less.

12. The barrier composition of claim 1, wherein the solid grade oligomer is derived from a salt of a styrene-acrylic copolymer, having a weight average molecular weight of 20,000 Daltons or less.

13. Paper, comprising the barrier composition of claim 1.

14. The paper of claim 13, wherein the paper exhibits a Cobb value of 25 g/m² or less.

15. The paper of claim 13, wherein the barrier composition has a coating weight of 5 g/m² to 30 g/m².

16. The paper of claim 13, wherein the paper has a moisture vapor transmission rate of from 10 g/m² to 25 g/m² per 24 hours when measured at 25° C. and 50 RH %.

17. The paper of claim 13, wherein the paper has a block resistance of 2 or less per 24 hours at 60° C. and 60 psi, as determined by ASTM WK20008.

18. The paper of claim 13, wherein the paper exhibits oil/grease resistant properties.

19. A method of making paper comprising, contacting a cellulosic fiber with a barrier composition, the barrier composition formed by
 polymerizing monomers comprising a vinyl aromatic monomer and a second monomer selected from the group consisting of butadiene, alkyl (meth)acrylates, and mixtures thereof, in the presence of a solid grade oligomer to form a mixture,
 wherein the barrier composition comprises a pigment present in an amount of from 1% to 50% by weight of the barrier composition, and wherein the solids in the barrier composition comprise 50% by weight or greater of the copolymer and solid grade oligomer.

20. The method of claim 19, wherein contacting the cellulosic fiber with a barrier composition comprises coating a paper web comprising the cellulosic fiber with an aqueous dispersion comprising the barrier composition.

21. The method of claim 19, wherein contacting a cellulosic fiber with the barrier composition, comprises mixing an aqueous dispersion comprising the barrier composition with the cellulosic fibers to form a slurry, and forming a paper web from the slurry of the cellulosic fibers and the barrier composition.

* * * * *